(12) United States Patent
De Guzman et al.

(10) Patent No.: US 7,266,456 B2
(45) Date of Patent: Sep. 4, 2007

(54) METHOD FOR MANAGEMENT OF MULTIPLE WELLS IN A RESERVOIR

(75) Inventors: Neil De Guzman, Houston, TX (US); Lawrence Lafferty, Alpharetta, GA (US)

(73) Assignee: Intelligent Agent Corporation, Houston, TX (US)

( * ) Notice: Subject to any disclaimer, the term of this patent is extended or adjusted under 35 U.S.C. 154(b) by 77 days.

(21) Appl. No.: 11/109,151

(22) Filed: Apr. 19, 2005

(65) Prior Publication Data

US 2005/0246104 A1    Nov. 3, 2005

Related U.S. Application Data

(60) Provisional application No. 60/622,060, filed on Oct. 26, 2004, provisional application No. 60/563,198, filed on Apr. 19, 2004, provisional application No. 60/563,232, filed on Apr. 19, 2004.

(51) Int. Cl.
*G01V 1/40* (2006.01)
*E21B 41/00* (2006.01)
*E21B 47/00* (2006.01)

(52) U.S. Cl. ................... 702/13; 166/250.15
(58) Field of Classification Search ........... 702/12, 702/13; 703/10; 166/250.15, 369, 52
See application file for complete search history.

(56) References Cited

U.S. PATENT DOCUMENTS

| | | | |
|---|---|---|---|
| 4,939,648 A | 7/1990 | O'Neill et al. ............ 702/11 |
| 5,237,539 A | 8/1993 | Selman ..................... 367/69 |
| 5,706,896 A | 1/1998 | Tubel et al. ............... 166/313 |
| 5,947,213 A | 9/1999 | Angle et al. .............. 175/24 |
| 6,002,985 A | 12/1999 | Stephenson ............... 702/13 |
| 6,012,015 A | 1/2000 | Tubel ....................... 702/6 |
| 6,052,679 A | 4/2000 | Aparicio, IV et al. ..... 706/15 |
| 6,109,367 A | 8/2000 | Beschel et al. ............ 175/24 |
| 6,236,894 B1 * | 5/2001 | Stoisits et al. ............. 700/28 |
| 6,282,452 B1 | 8/2001 | De Guzman et al. ..... 700/32 |
| 6,434,435 B1 * | 8/2002 | Tubel et al. ............... 700/30 |
| 6,581,049 B1 | 6/2003 | Aparicio, IV et al. ..... 706/39 |
| 7,062,420 B2 * | 6/2006 | Poe, Jr. .................... 703/10 |
| 2003/0033265 A1 | 2/2003 | Cabana et al. ............. 706/15 |

* cited by examiner

*Primary Examiner*—Donald McElheny, Jr.
(74) *Attorney, Agent, or Firm*—Tim Headley; Wright Brown & Close, LLP (57) ABSTRACT

A method of managing multiple wells connected to a reservoir comprises the steps of:
  setting production and performance goals for each individual well;
  monitoring the performance of each individual well;
  enabling each individual well to assess its own situational state; and
  enabling socially interactive corrective actions, comprising enabling collaboration and cooperation among the wells, such that the wells share with each other their situational states, goals, and plan data; developing and refining remediation strategies for problems detected within the wells; allowing execution of the remediation strategies either independently, or by operator intervention; applying the remediation strategies to each individual well; revising and resetting the goals, and integrating pattern recognition and machine learning within all preceding steps.

12 Claims, 7 Drawing Sheets

METHOD FOR MANAGEMENT OF MULTIPLE WELLS IN A RESERVOIR

CROSS-REFERENCES TO RELATED APPLICATIONS.

This application claims the benefit of the following U.S. Provisional Application No. 60/563,232, filed Apr. 19, 2004, No. 60/563,198, filed Apr. 19, 2004, and No. 60/622,060, filed Oct. 26, 2004.

BACKGROUND OF THE INVENTION

1. Field of the Invention

This invention relates generally to the monitoring and management of individual petroleum wells, to the management of multiple wells in a petroleum reservoir.

2. Description of Related Art

The oil and gas industry has attempted to achieve the highest value from a reservoir containing oil and gas by extracting as much as possible as quickly as possible from the wells. There have been many improvements over the last several years in extracting data from existing wells, and from seismic activities, in order to increase the percentage of hydrocarbons recovered from any particular reservoir:

1. Sensors are located temporarily or permanently in wells to indicate amounts from each production location and the condition of the reservoir through examination of pressure and temperatures.
2. Seismic data is now taken at frequent time intervals and combined with geologic and geophysical information to predict the flow of hydrocarbons though the reservoir towards the wells.
3. Large scale models have been built to simulate production under different assumptions.
4. Visualization systems have been developed to show operators in a three dimensional manner the interaction of all the information extracted from the sensors and demonstrate how the hydrocarbons are being produced.

In spite of these improvements, three core problems remain. First, production is managed with episodic interventions in each individual well's activity. Second, the amounts and types of data generated by sensing systems in wells cause a data overload problem for operators. Too much data is produced at rates which are too high for operators to assess and respond to abnormal conditions. The cost of moving this data throughout an organization, and managing its use, is high.

Third, even if operators were able to manage these large data streams, no methods exist for exploiting information about each individual well's production, so that production from the entire reservoir can be adjusted continuously. Such a method would enable increased production from the reservoir as a whole. This has been a difficult problem, one characterized by large amounts of data that describe complex environmental interactions. In addition, managing multiple wells in a reservoir demands that decisions be made within a timeframe that allows corrective action to be effective for increased hydrocarbon production.

What is needed is a method of managing multiple wells in a reservoir, including wells that have very little instrumentation (dumb wells); instrumented wells with surface controls (intelligent and smart wells); and reservoirs that are highly instrumented with fiber optic sensors, seismic sensors, flow meters, and other instruments and controls. In addition, such method should reduce the data overload on operators so they can be more efficient when human intervention is necessary, and the method would provide continuous adjustment of well conditions to achieve optimal production at all times.

SUMMARY

A method of managing multiple wells connected to a reservoir comprises the steps of:
  setting production and performance goals for each individual well;
  monitoring the performance of each individual well;
  enabling each individual well to assess its own situational state; and
  enabling socially interactive corrective actions, comprising enabling collaboration and cooperation among the wells, such that the wells share with each other their situational states, goals, and plan data; developing and refining remediation strategies for problems detected within the wells; allowing execution of the remediation strategies either independently, or by operator intervention; applying the remediation strategies to each individual well; revising and resetting the goals, and integrating pattern recognition and machine learning within all preceding steps.

These elements are re-usable, and enable replication of the method across most of the activities necessary for the production of hydrocarbons such as drilling; completions; logistics; management of economics, production, earth models; transportation, and refining.

The method of the present invention can be extended to all components in a hydrocarbon gathering system, including pumps, compressors, pipelines, and transactions related to hydrocarbon sales.

DETAILED DESCRIPTION OF THE PREFERRED EMBODIMENT

Figure 1:
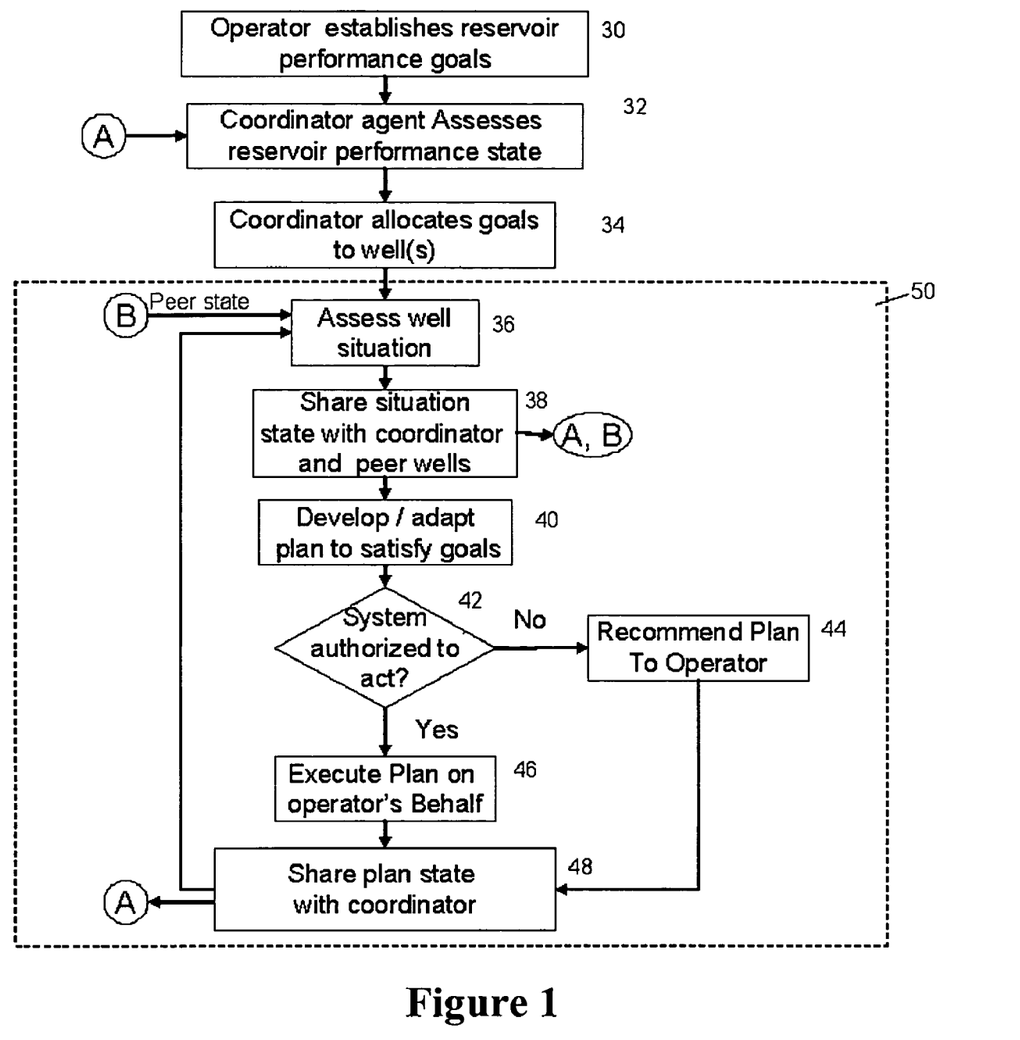
FIG. 1 is a reservoir management processing flow diagram, depicting the top-level processing performed for managing multiple wells in a reservoir.

Referring to FIG. 1, in step 30 an operator establishes reservoir performance goals. Typically the operator is a human, though this function may be performed by a software agent. In step 32 a coordinator agent, a software program operating to assesses the reservoir performance state, determines the extent to which reservoir performance goals are being achieved. The coordinator agent may receive as input from a human or other software operator, the goals for reservoir performance. Based on this assessment of reservoir state, in step 34 the coordinator agent allocates goals to well(s) in the reservoir. Step 34 does not require a strict centralized command and control paradigm. Distributed command and control strategies such as swarm intelligence or auctioning are appropriate.

The primary consideration for multi-well management is implementation of an appropriate control strategy for wells distributed across a reservoir. This is a function performed at step 34. The processing steps 36 through 48 represent activities that occur within a single well. Those processing steps 36 through 48, executing on a single well, are an intelligent agent 50. An intelligent agent is a software program that is connected by suitable communication links (such as wires or wireless means) to hardware sensors and actuators. An intelligent agent may perform monitoring tasks to determine when normal versus abnormal conditions exist. Intelligent agents may be connected to fiber optic data gathering systems to perform tasks such as assessment of flow characteristics at multiple intervals in a well. Intelligent agents may incorporate models of an environment (e.g., a well or reservoir) by storing values which describe features of the environment. Intelligent agents may learn and adapt their behavior with experience.

Intelligent agents can perform many of the functions normally performed by operators, including running models or simulations, or determining best courses of actions. Based on their perception of conditions, intelligent agents may either make recommendations to operators to correct problems detected in the situation or, if authorized by an operator, act autonomously to correct problems.

In addition to being deployed on wells, intelligent agents are also implemented to execute on other components of the gathering and production system. Representative components of the gathering and production system include pipelines, pumps, compressors, and components monitoring nominations and current market prices. Thus, the method of the present invention uses intelligent agents as well agents, riser agents, pipeline gathering system agents, compressor agents, market nomination agents, and pricing/cost agents. Also, all of these intelligent agents execute on multiple wells, and their associated gathering and production systems, concurrently.

In step 36 the human operator or a software agent determines the well state with respect to the well's performance goals by comparing current sensor readings to the desired conditions, also expressed as sensor values. In step 38, to facilitate collaborative achievement of reservoir performance goals, the well shares its situation state with peer wells and with the coordinator agent. Connector A represents situation state data flow from the intelligent agent 50 to the operator in step 32. Connector B represents situation state data flow from the intelligent agent 50 to a peer intelligent agent.

In step 40 the operator develops a new plan or adapts an existing plan to satisfy the well's goals. Prior art in the domain of decompositional planning, as implemented in the PreAct toolkit, manufactured by Applied Systems Intelligence, Inc., located in Roswell, Ga., provides this capability. This technology involves decomposition of high-level goals into specific plans and strategies for achieving goals. An approach which uses an "and/or" structure known as a plan-goal graph is discussed below.

Referring to steps 40–48, given variance in well designs, well location, communications infrastructure, and reservoir characteristics, the method of the present invention for managing multiple wells supports both centralized control (one intelligent agent in charge) and distributed control approaches (control shared among multiple intelligent agents).

Centralized control architectures use a centralized supervisor to coordinate all of the tasking for the other wells. In this architecture, sensor inputs are fed to the coordinator agent and the other wells accept commands for action assignments. Software within this coordinator agent performs the control function and ensures that activities across multiple wells are coordinated. The coordinator's perspective serves as the most logical place to interface with a human operator. As appropriate, in step 46 human operators delegate authority to the coordinator agent to act autonomously on behalf of the human operator. If the operator has authorized the system to act on the operator's behalf, then in step 46 the plan is executed by the system. Otherwise, the intelligent agent 50 recommends the plan to the operator in step 44. To facilitate collaborative achievement of reservoir performance goals, the intelligent agent 50 shares its plan state with the coordinator agent in step 48.

Referring again to steps 40–48, distributed control systems seek to distribute the task allocation across all of the intelligent agents, thus avoiding any centralized point of control. A number of alternative strategies exist for distributed control, including deployment of redundant facilitators and strategies such as swarm behavior. A software technique called auctioning is a preferred approach for establishing distributed control.

In an auction, particular well agents called auctioneers communicate conditions to be fulfilled, and receive and evaluate bids from other agents called bidders that can fulfill the conditions by performing certain actions. The auctioneer selects a bidder based on a value calculation in which the resources needed by an agent and the value promised by the bidder are compared among bidders. Bidders receive announcements, prepare and transmit bids, and confirm acceptance of awards. Some agents can act as both auctioneers and bidders, even simultaneously, while participating in separate auctions. The price of an action rises as an agent becomes burdened, and the cost falls as the agent frees up resources.

Figure 2:
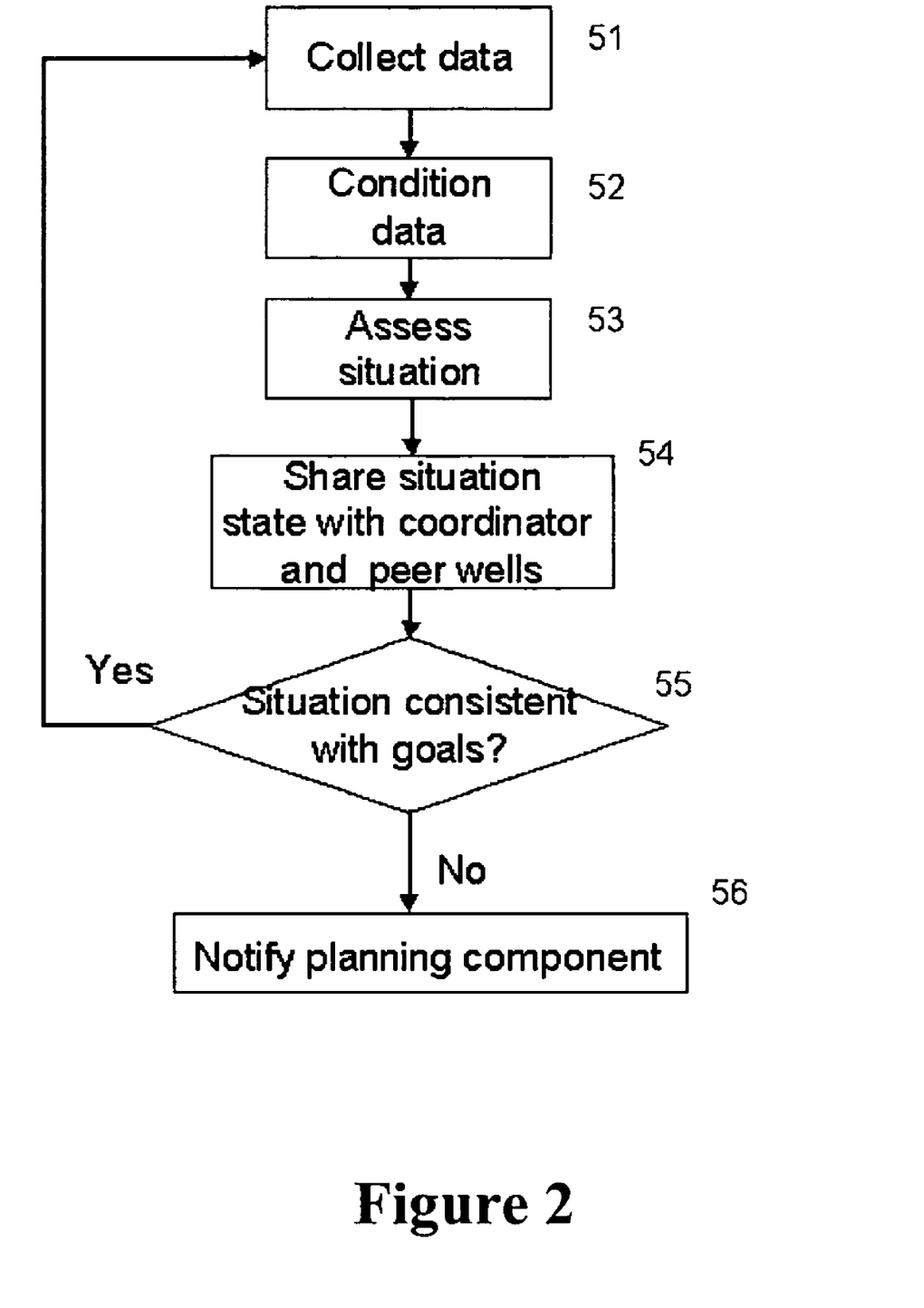
FIG. 2 is a processing flow diagram for processes performed during the situation

Referring now to FIG. 2, in step 51 data are collected by the agent, in step 52 the method of the present invention provides software mechanisms for detecting, combining, organizing, and conditioning data to be readied for an assessment step. In step 53 the method of the present invention provides a software means of assessing and monitoring a situation. In step 54 the method of the present invention performs tasks such as diagnosis, problem solving, and plan generation. In step 55 the method of the present invention provides software mechanisms for invoking procedures relevant to decisions, such as execution of a plan generated by the planning component according to methods explained below. After step 55, the method continues back to step 51.

Figure 3:
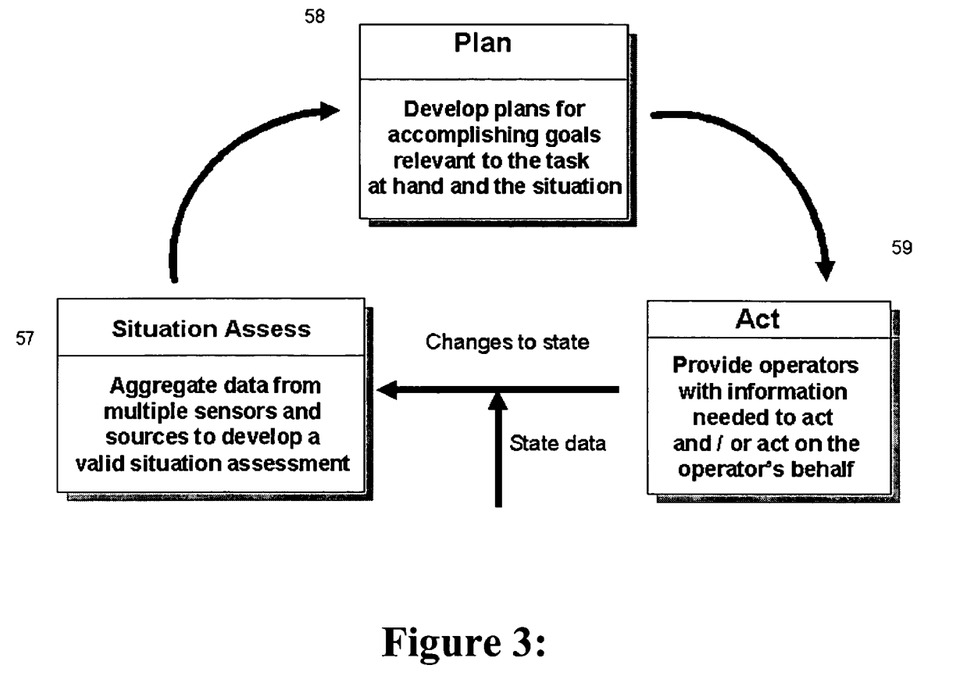
FIG. 3 is a fundamental control and command loop, depicting the basic control loop required for situation assessment, planning, and acting.

Now referring to FIG. 3: Continuous we see that step 57 the situation assessment component in the loop provides mechanisms for detecting, combining, organizing, assessing and monitoring a situation. Step 58, the planning component in the control loop can perform tasks such as diagnosis, problem solving, and plan generation. Step 59, the action component provides mechanisms for invoking procedures relevant to decisions, such as execution of a plan generated by the Planning component according to methods explained hereafter.

Associate systems provide the functionality shown in FIG. 3. Associate systems are software programs that enable continuous situation assessment and planning. The development toolkit known as PreAct, (previously listed with respect to step 40 in FIG. 1) provides a knowledge-based approach for implementation of continuous situation assessment and planning.

Figure 4:
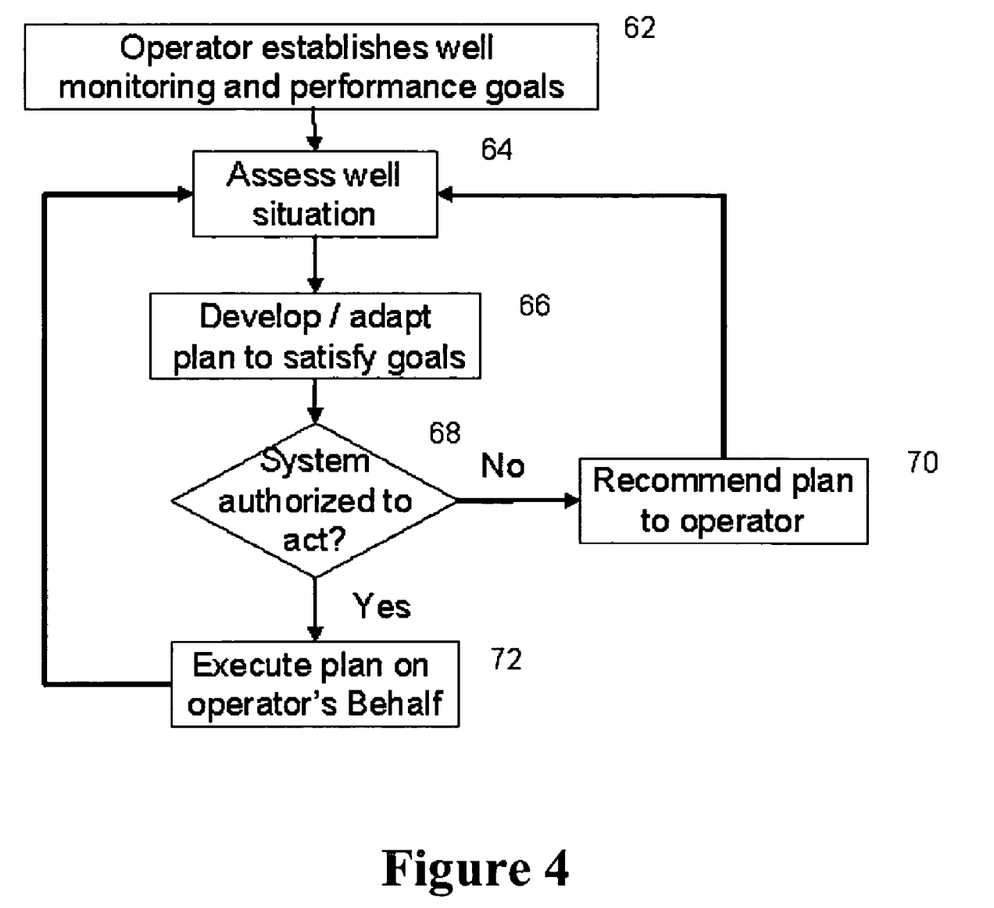
FIG. 4 is a processing flow diagram for monitoring and managing a single well.

Again referring to FIG. 2, the method of the present invention uses two core knowledge structures: concept graphs (which are used for situation assessment) and plan-goal graphs (which are used for planning). Referring now to FIG. 4, in contrast to FIG. 1, which concerns an entire reservoir with multiple wells, FIG. 4 depicts the steps in managing an individual well or a set of individual wells. In contrast with FIG. 1, The management of multiple wells in a reservoir, as described in FIG. 1, improves performance of the reservoir itself.

The monitoring and management of an individual well or a set of individual wells, as described in FIG. 4, enables monitoring and performance improvements on individual wells without regard for how these individual improvements impact the reservoir as a whole.

Therefore, FIG. 4 describes a part of the invention that is a method that is used as an automated surveillance and monitoring system that tracks multiple performance parameters of a single well, and alerts an operator when abnormal behavior patterns are identified. Thus, this part of the method functions to alert operators of anomalous sand production, or the development of hydrates.

In step 62 the operator establishes well monitoring and performance goals. For example, the operator may specify that a well is to be monitored for flow assurance problems such as hydrate formation.

In step 64, the method of the present invention the human operator or an intelligent agent assesses the well situation by comparing current conditions to patterns of normal or abnormal behavior stored in an associative memory. This method of automated surveillance monitoring is superior to methods which rely on setting thresholds, because abnormal conditions of interest are often indicated by the interactions between values in multiple time-series data streams.

Associative memories are pattern recognition components, and are disclosed in U.S. Pat. Nos. 6,052,679 and 6,581,049, and in U.S. patent application 20030033265, all of which are incorporated herein by this reference. An implementation of associative memories, named SaffronOne version 3.1, is sold by Saffron Technologies, Inc., located in Morrisville, N.C. Saffron's associative memory can process data from both structured sources (e.g., databases, XML data streams) and unstructured sources (e.g., free text). Unstructured data such as well tests, logs, and reports are commonly available in the petroleum industry but this data is not presently used in automated systems to manage production. Associative memories provide a means to remedy this deficiency.

Based on the assessment performed in step 64, the method of the present invention then develops a plan or plans in step 66 to satisfy monitoring and performance goals. If the well situation has not appreciably changed, changes to the current monitoring and management plan may be minor. There may also be hysteresis in the reaction to small changes so that the system does not constantly exhibit "seeking" behavior. If in step 68 the method of the present invention is authorized to act on behalf of the user, then in step 72 the method of the present invention executes the plan on the operator's behalf. If not authorized, then in step 70 the method of the present invention recommends the plan to the operator.

The process described in FIG. 4 provides a means for continuously adapting the operating parameters of each well and groups of wells, instead of relying on periodic optimization. In addition, the process supports the application of individual well management programs for tasks such as gas lift and beam pump control to multiple wells.

Referring now to FIG. 2, this flow diagram provides additional detail for step 36 of FIG. 1. This processing flow applies whether an operator is monitoring wells individually or monitoring multiple wells to improve performance of the reservoir as a whole.

In step, 51 situation assessment for a well begins with data collection The data are typically values of parameters such as pressure, temperature, flow rates valve positions, and so on. These are time-series data values, meaning that the data are provided periodically to the system.

In step 52 the method of the present invention conditions the data, generating values of derived attributes which describe the nature of the time-series data provided to the agent. Representative values include noise-filtered baseline values, rates of change, step change indications, spike detections, and so on. Data conditioning includes use of Fourier transforms and other signal processing mathematical means to identify the values of attributes of the data.

Figure 5:
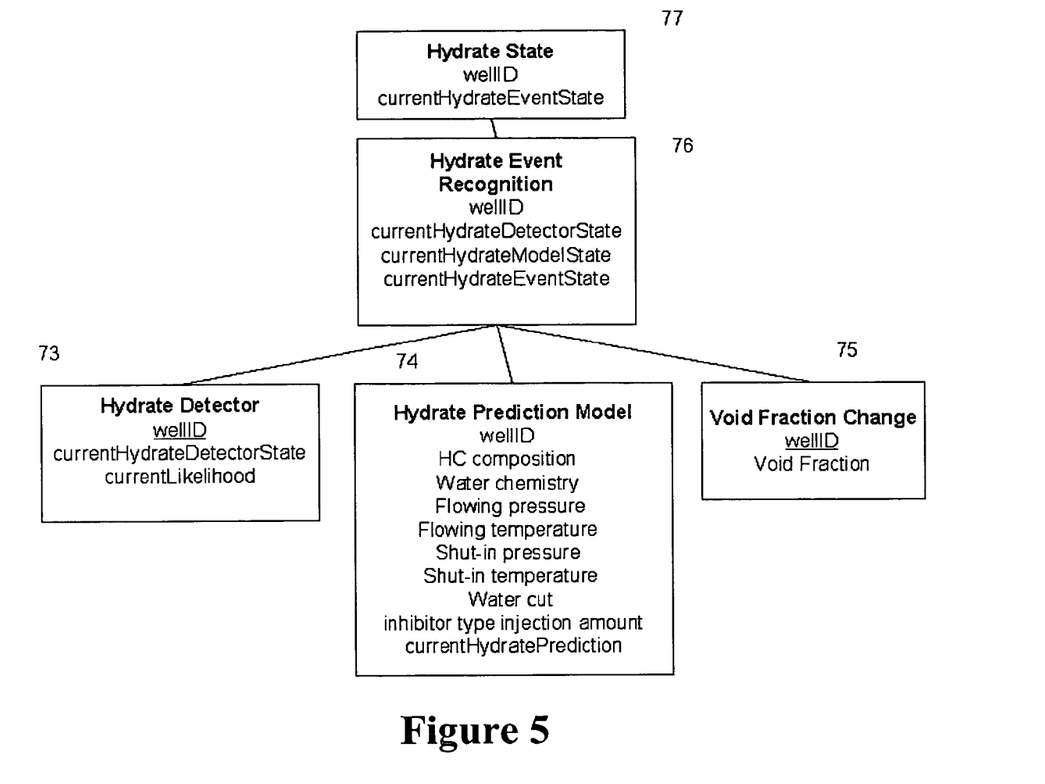
FIG. 5 is a concept graph providing a more detailed example of hydrate detection.

In step 53 the method of the present invention assesses a situation, applying algorithms to combine data from various sources to determine the nature of the situation. One of the assessments in step 53 is determining that a rising value for downhole pressure in conjunction with a falling value for tubing head pressure indicates flow impairment. Data sources include real-time data streams, data bases, models, and other processes. Concept graphs, such as the one shown in FIG. 5 are the preferred method for performing the assess situation step 53. As data works its way up through the concept graph the state of the well or wells is identified.

The situation assessment step 53 employs a concept graph integrated with associative memory components trained to perform specific functions such as detection of a downhole pressure that is not correlated with a well choke valve change. Since associative memories can combine data from multiple sources, a single associative memory can do the work of many concept graph nodes, resulting in more efficient processing. The concept graph effectively functions as a framework for organizing multiple associative memories so that their pattern recognition capabilities can be coordinated. In this way the situation assessment step 53 overcomes the problem of data overload by processing raw data to deliver actionable information to a human or automated operator.

Referring now to FIG. 5 the method of the present invention uses a sand or hydrate concept graph to recognize sand "and/or" hydrate events. Data enters the graph at the bottom (leaf nodes, i.e., bottom nodes of the graph) and propagates upward through the graph. Referring again to FIG. 5, in this concept graph for hydrate recognition, each node in the graph identifies representative variables (though not all variables) whose values are used or calculated during processing at that particular node. Time-series data from sensor systems (pressure, temperature, etc.) and from data bases are conditioned using a variety of signal processing algorithms to remove noise, detect trends, and so on. This data flows into leaf nodes in the concept graph. Step 73 represents a Saffron memory trained to detect conditions indicative of a hydrate at a particular point in time. Step 73 produces values such as a current Hydrate Detector State and a current Likelihood value.

In step 74 the method of the present invention integrates results from an external model during assessment. Data such as hydrocarbon composition, pressure, temperature, and water cut are passed to the agent from sensors. The agent then passes the conditioned values to an external hydrate formation model that can determine whether conditions exist that enable hydrate formation. The method of the present invention then uses a variety of models to address flow control, reservoir characteristics, and other common issues. These models can be invoked by the agent, or data from the model can be incorporated directly in the intelligent agents. In step 74, the method of the present invention produces a value for current Hydrate Prediction. In step 75 the method of the present invention captures data about the void fraction in the hydrocarbon stream.

In step 76 the method of the present invention combines data from steps 73, 74, and 75. In addition, in step 76 the method takes a time-averaged view of well conditions, thereby providing an additional means for handling noise in the time-series data streams. Step 76 produces a well state value (e.g., nominal, hydrate indications, or hydrate formation in progress) for the variable "current Hydrate Event State." In step 77 the method receives data from step 76 and fires a software trigger to notify the planning component (i.e.; step 40 of FIG. 1 or step 66 of FIG. 4) when a hydrate event occurs.

Returning to FIG. 2, in step 54, the well's state is shared with the coordinator agent and with peer wells. A preferred method of sharing situation state is by selectively passing concept graph node state data to the coordinator agent and peers.

The method of the present invention performs a test in step 55 to determine if the current situation is consistent with the desired goals. If not, the planning agent (i.e.; step 40 of FIG. 1 or step 66 of FIG. 4 that is the planning component of the well agent) is notified in step 56 so that a plan can be developed or adapted to address the situation. Thus, the processing functions described in FIG. 2, steps 51, 52, 53, 54, and 55 are sufficient to enable implementation of methods for automated monitoring and surveillance of sets of individual wells. The method of the present invention includes an automated monitoring and surveillance method, which performs situation assessment of multiple wells, and notifies the operator (human or software agent) when conditions on any individual well deviate from nominal.

Figure 6:
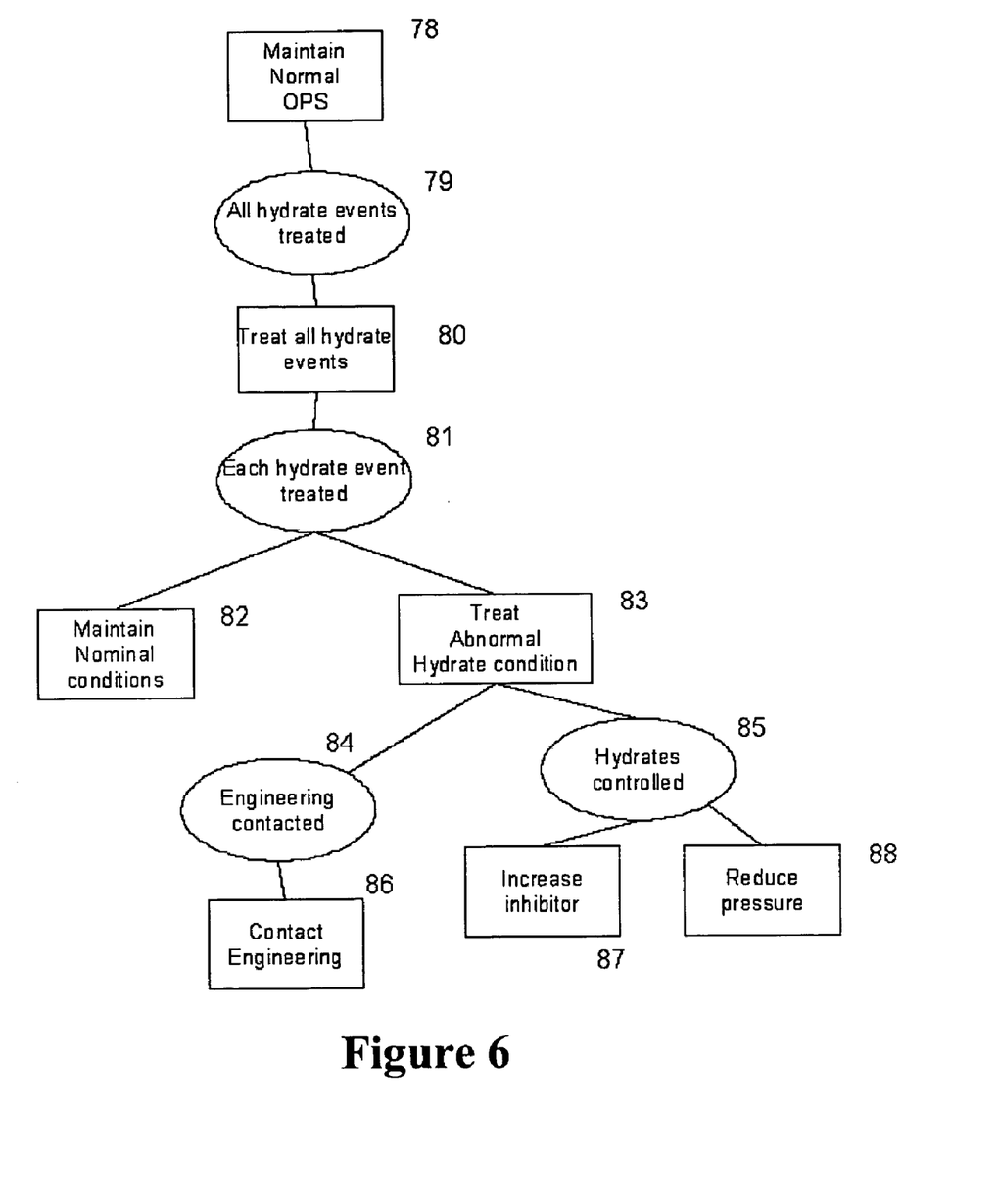
FIG. 6 is a plan-goal graph fragment used for managing hydrate conditions.

Referring now to FIG. 6, the method of the present invention uses a plan-goal graph for managing sand and hydrate events. A plan-goal graph is an "and/or" graph which is decomposed (top-to-bottom) during plan development. In FIG. 6, ovals represent goals and rectangles represent plans. Goals are processing components that establish a desired state and evaluate the extent to which the state has been achieved. Plans are processing components that specify strategies for accomplishing goals. In steps 78, 79, and 80 of FIG. 6 high-level plans and goals enable planning for multiple wells concurrently. Step 81 is a goal which is instantiated for each well being monitored. Depending upon the well state identified through situation assessment, either the Maintain Nominal Conditions step 82 or the Treat Abnormal Hydrate Conditions step 83 will be created. If an abnormal condition is being managed, the plan will be decomposed to further detail to ensure that the goals Engineering Contacted in step 84 and Hydrates Controlled in step 85 are satisfied. Steps 86, 87, and 88 represent detailed plans. Tasks such as Increase Inhibitor in step 87 are performed by the operator or by the automated method if the operator has authorized the method to act.

Figure 7:
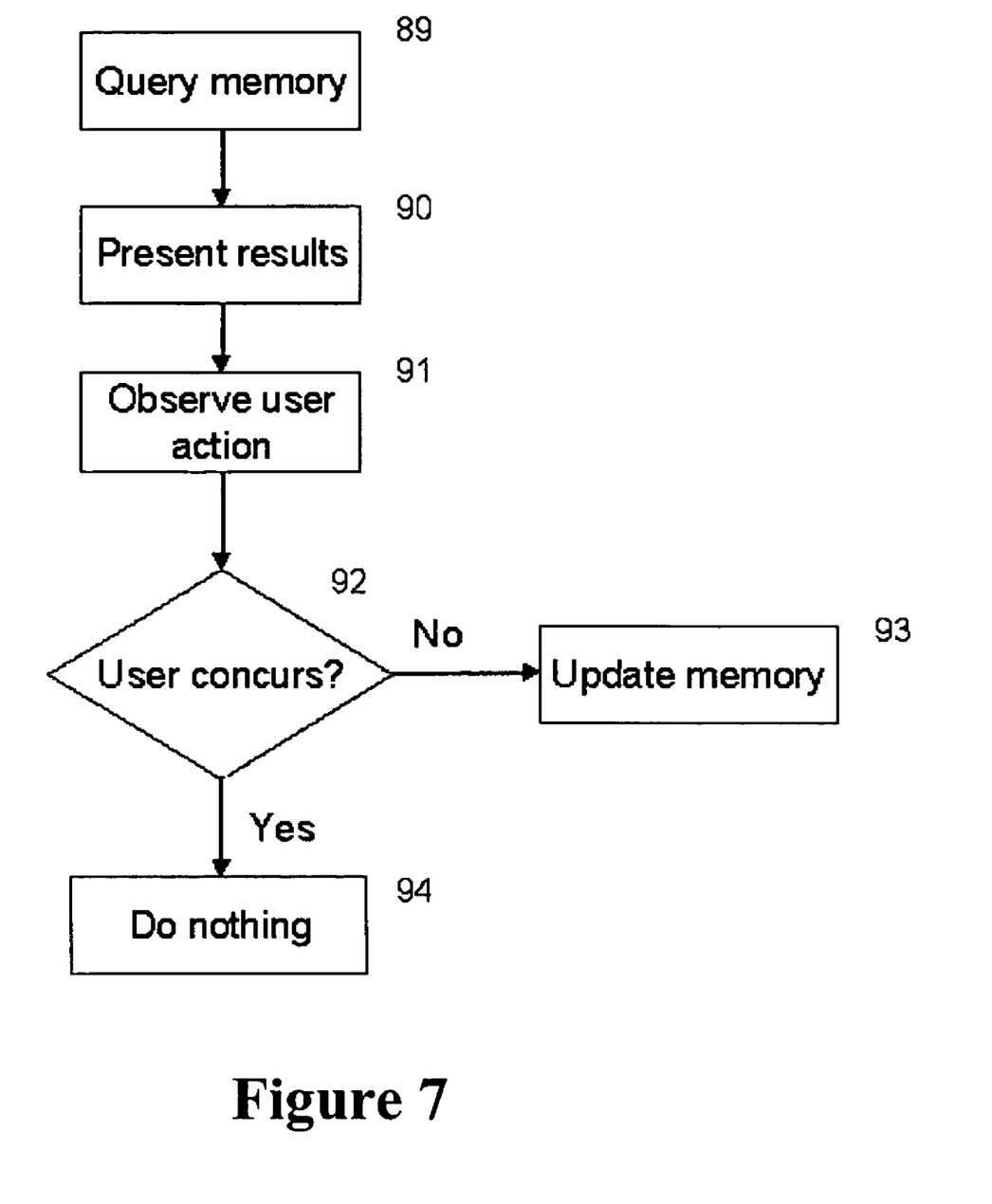
FIG. 7 is a processing flow diagram for functions performed to enhance a system's performance via machine learning.

Referring now to FIG. 7, the present invention includes a machine learning capability. Associative memories provide a mechanism for machine learning. As new patterns of interest become available, they can be stored in the memories, thereby providing a mechanism for machine learning from experience. For one or more nodes in the method's concept graph and one or more nodes in the method's plan-goal graph, associative memories replace the knowledge bases that are conventionally employed at these nodes. During execution, instead of invoking a knowledge base, the method queries the associative memory to generate data required for further processing.

In step 89, in conjunction with situation assessment and planning, an associative memory situated within either a concept graph or a plan-goal graph is queried. This query generates results that comprise at least part of the result set which is presented to the user in step 90. The system observes the users' actions in step 91 with respect to the situation assessment or planning data presented. For example, during monitoring for sand conditions, the system may notify the operator that sand is being produced at a rate that exceeds nominal. The operator may accept this assessment, or may modify the system's assessment. If in step 92 the operator concurs with the system, no learning occurs (step 94). Otherwise, the associative memory is updated in step 93, providing a means for modifying the system's behavior in the future.

What is claimed is:

1. A method of managing multiple wells connected to a reservoir. comprising the steps of:
   a. setting production and performance goals for each individual well;
   b. monitoring the performance of each individual well;
   c. enabling each individual well to assess its own situational state; and
   d. enabling socially interactive corrective actions comprising enabling collaboration and cooperation among the wells, such that the wells share with each other their situational states, goals, and plan data; developing and refining remediation strategies for problems detected within the wells; allowing execution of the remediation strategies either independently, or by operator intervention; applying the remediation strategies to each individual well; revising and resetting the goals, and integrating pattern recognition and machine learning within all preceding steps, wherein associative memories are used in the step of monitoring the performance of each individual well.

2. A method of managing multiple wells connected to a reservoir, comprising the steps of:
   a. selling production and performance goals for each individual well;
   b. monitoring the performance of each individual well;
   c. enabling each individual well to assess its own situational state; and
   d. enabling socially interactive corrective actions, comprising enabling collaboration and cooperation among the wells, such that the wells share with each other their situational states, goals, and plan data; developing and refining remediation strategies for problems detected within the wells; allowing execution of the remediation strategies either independently, or by operator intervention; applying the remediation strategies to each individual well; revising and resetting the goals, and integrating pattern recognition and machine learning within all preceding steps, wherein associative memories are used in the step of enabling each individual well to assess its own situational state.

3. A method of managing multiple wells connected to a reservoir, comprising the steps of:
   a. setting production and performance goals for each individual well;
   b. monitoring the performance of each individual well;
   c. enabling each individual well to assess its own situational state; and
   d. enabling socially interactive corrective actions, comprising enabling collaboration and cooperation among the wells, such that the wells share with each other their situational states, goals, and plan data; developing and refining remediation strategies for problems detected within the wells; allowing execution of the remediation strategies either independently, or by operator intervention; applying the remediation strategies to each individual well; revising and resetting the goals, and integrating pattern recognition and machine learning within all preceding steps,
   wherein associative memories are used in the step of enabling socially interactive corrective actions.

4. A method of managing multiple wells connected to a reservoir, comprising the steps of:
   a. setting production and performance goals for each individual well;
   b. monitoring the performance of each individual well;
   c. enabling each individual well to assess its own situational state; and
   d. enabling socially interactive corrective actions, comprising enabling collaboration and cooperation among the wells, such that the wells share with each other their situational states, goals, and plan data; developing and refining remediation strategies for problems detected within the wells; allowing execution of the remediation strategies either independently, or by operator intervention; applying the remediation strategies to each individual well; revising and resetting the goals, and integrating pattern recognition and machine learning within all preceding steps,
   wherein the parts of the step of enabling socially interactive corrective actions are performed using auctioning algorithms.

5. A method of managing a reservoir connected to multiple wells, comprising the steps of:
   a. selling production and performance goals for each individual well and for the
   b. monitoring the performance of each individual well and of the reservoir as a whole;
   c. enabling each individual well to assess its own situational state; and
   d. enabling socially interactive corrective actions, comprising enabling collaboration and cooperation among the wells, such that the wells share with each other their situational states, goals, and plan data; developing and refining remediation strategies for problems detected within the wells; allowing execution of the remediation strategies either independently, or by operator intervention; applying the remediation strategies to the individual wells and to the reservoir as a whole; revising and resetting the goals, and integrating pattern recognition and machine learning within all preceding steps,
   wherein associative memories are used in the step of monitoring the performance of each individual well and of the reservoir as a whole.

6. A method of managing a reservoir connected to multiple wells, comprising the steps of:
   a. setting production and performance goals for each individual well and for the reservoir;
   b. monitoring the performance of each individual well and of the reservoir as a whole;
   c. enabling each individual well to assess its own situational state; and
   d. enabling socially interactive corrective actions, comprising enabling collaboration and cooperation among the wells, such that the wells share with each other their situational states, goals, and plan data; developing and refining remediation strategies for problems detected within the wells; allowing execution of the remediation strategies either independently, or by operator intervention; applying the remediation strategies to the individual wells and to the reservoir as a whole; revising and resetting the goals, and integrating pattern recognition and machine learning within all preceding steps,
   wherein associative memories are used in the step of enabling each individual well to assess its own situational state.

7. A method of managing a reservoir connected to multiple wells, comprising the steps of:
   a. setting production and performance goals for each individual well and for the reservoir;
   b. monitoring the performance of each individual well and of the reservoir as a whole;
   c. enabling each individual well to assess its own situational state; and
   d. enabling socially interactive corrective actions, comprising enabling collaboration and cooperation among the wells, such that the wells share with each other their situational states, goals, and plan data; developing and refining remediation strategies for problems detected within the wells; allowing execution of the remediation strategies either independently, or by operator intervention; applying the remediation strategies to the individual wells and to the reservoir as a whole; revising and resetting the goals, and integrating pattern recognition and machine learning within all preceding steps,
   wherein associative memories are used in the step of enabling socially interactive corrective actions.

8. A method of managing a reservoir connected to multiple wells, comprising the steps of:
   a. setting production and performance goals for each individual well and for the reservoir;
   b. monitoring the performance of each individual well and of the reservoir as a
   c. enabling each individual well to assess its own situational state; and
   d. enabling socially interactive corrective actions, comprising enabling collaboration and cooperation among the wells, such that the wells share with each other their situational states, goals, and plan data; developing and refining remediation strategies for problems detected within the wells; allowing execution of the remediation strategies either independently, or by operator intervention; applying the remediation strategies to the individual wells and to the reservoir as a whole; revising and resetting the goals, and integrating pattern recognition and machine learning within all preceding steps,
   wherein the parts of the step of enabling socially interactive corrective actions are performed using auctioning algorithms.

9. A method of managing multiple gathering and production systems connected to a reservoir, comprising the steps of:
   a. setting production and performance goals for each system;
   b. monitoring the performance of each individual system;
   c. enabling each individual system to assess its own situational states; and
   d. enabling socially interactive corrective actions, comprising enabling collaboration and cooperation among the systems, such that the systems share with each other their situational states, goals, and plan data; developing and refining remediation strategies for problems detected within the systems; allowing execution of the remediation strategies either independently, or by operator intervention; applying the remediation strategies to each individual system; revising and resetting the goals, and integrating pattern recognition and machine learning within all preceding steps, wherein associative memories are used in the step of monitoring the performance of each individual system.

10. A method of managing multiple gathering and production systems connected to a reservoir, comprising the steps of:
   a. setting production and performance goals for each system;
   b. monitoring the performance of each individual system;
   c. enabling each individual system to assess its own situational states; and
   d. enabling socially interactive corrective actions, comprising enabling collaboration and cooperation among the systems, such that the systems share with each other their situational states, goals, and plan data; developing and refining remediation strategies for problems detected within the systems; allowing execution of the remediation strategies either independently, or by operator intervention; applying the remediation strategies to each individual system; revising and resetting the goals, and integrating pattern recognition and machine learning within all preceding steps, wherein associative memories are used in the step of enabling each individual system to assess its own situational state.

11. A method of managing multiple gathering and production systems connected to a reservoir, comprising the steps of:
   a. setting production and performance goals for each system;
   b. monitoring the oerformance of each individual system;
   c. enabling each individual system to assess its own situational states; and
   d. enabling socially interactive corrective actions, comprising enabling collaboration and cooperation among the systems, such that the systems share with each other their situational states, goals, and plan data; developing and refining remediation strategies for problems detected within the systems; allowing execution of the remediation strategies either independently, or by operator intervention; applying the remediation strategies to each individual system; revising and resetting the goals, and integrating pattern recognition and machine learning within all preceding steps, wherein associative memories are used in the step of enabling socially interactive corrective actions.

12. A method of managing multiple gathering and production systems connected to a reservoir, comprising the steps of:
   a. setting production and performance goals for each system;
   b. monitoring the performance of each individual system;
   c. enabling each individual a system to assess its own situational states; and
   d. enabling socially interactive corrective actions, comprising enabling collaboration and cooperation among the systems, such that the systems share with each other their situational states, goals, and plan data; developing and refining remediation strategies for problems detected within the systems; allowing execution of the remediation strategies either independently, or by operator intervention; applying the remediation strategies to each individual system; revising and resetting the goals, and integrating pattern recognition and machine learning within all preceding steps, wherein the parts of the step of enabling socially interactive corrective actions are performed using auctioning algorithms.

* * * * *